(12) United States Patent
Diaz Carroza et al.

(10) Patent No.: US 12,018,449 B2
(45) Date of Patent: Jun. 25, 2024

(54) RETROFIT FOR EXISTING WIND TURBINE FOUNDATIONS, RETROFITTED WIND TURBINE FOUNDATION AND METHOD FOR RETROFITTING A WIND TURBINE FOUNDATION

(71) Applicants: Marta Diaz Carroza, Essen (DE); Rüdiger Marquardt, Essen (DE); Ali Mohammadi Mohaghegh, Essen (DE)

(72) Inventors: Marta Diaz Carroza, Essen (DE); Rüdiger Marquardt, Essen (DE); Ali Mohammadi Mohaghegh, Essen (DE)

(73) Assignee: RWE Renewables Europe & Australia GmbH, Essen (DE)

( * ) Notice: Subject to any disclaimer, the term of this patent is extended or adjusted under 35 U.S.C. 154(b) by 0 days.

(21) Appl. No.: 18/482,119

(22) Filed: Oct. 6, 2023

(65) Prior Publication Data
US 2024/0026631 A1    Jan. 25, 2024

Related U.S. Application Data

(63) Continuation of application No. PCT/EP2021/059421, filed on Apr. 12, 2021.

(51) Int. Cl.
*E02D 27/42* (2006.01)
*F03D 13/20* (2016.01)

(52) U.S. Cl.
CPC ........... *E02D 27/425* (2013.01); *F03D 13/20* (2016.05); *F05B 2230/80* (2013.01)

(58) Field of Classification Search
CPC ..... F05B 2230/80; F03D 13/20; E02D 27/425
See application file for complete search history.

(56) References Cited

U.S. PATENT DOCUMENTS

| | | | |
|---|---|---|---|
| 7,155,875 B2* | 1/2007 | Henderson | E04H 12/085 52/294 |
| 9,783,950 B2* | 10/2017 | Henderson | E02D 27/425 |
| 10,640,995 B2* | 5/2020 | Phuly | E02B 17/025 |
| 10,648,150 B2* | 5/2020 | Henderson | E02D 27/08 |
| 10,815,969 B2* | 10/2020 | Liu | E02D 27/425 |
| 11,434,617 B2* | 9/2022 | Henderson | E02D 27/08 |
| 11,814,808 B2* | 11/2023 | Henderson | E02D 27/08 |
| 2008/0236073 A1 | 10/2008 | Bagepalli et al. | |
| 2016/0097179 A1 | 4/2016 | Henderson | |
| 2024/0026631 A1* | 1/2024 | Diaz Carroza | F03D 13/22 |

FOREIGN PATENT DOCUMENTS

KR    20200057954 A    5/2020
WO    WO 2018/086022 A1    5/2018

* cited by examiner

*Primary Examiner* — Andrew J Triggs
(74) *Attorney, Agent, or Firm* — Reinhart Boerner Van Deuren P.C.

(57) ABSTRACT

A retrofit for existing wind turbine foundations including a perimetral structure around an outer perimeter of a base of the existing wind turbine foundation, a pedestal structure on top of a pedestal of the existing wind turbine foundation and at least three lever arms, wherein the lever arms extend radially from the pedestal structure to the perimetral structure and are angularly spaced wherein the lever arms connect the perimetral structure with the pedestal structure.

17 Claims, 7 Drawing Sheets

RETROFIT FOR EXISTING WIND TURBINE FOUNDATIONS, RETROFITTED WIND TURBINE FOUNDATION AND METHOD FOR RETROFITTING A WIND TURBINE FOUNDATION

CROSS-REFERENCE TO RELATED PATENT APPLICATIONS

This patent application is a continuation of International Application No. PCT/EP2021/059421, filed Apr. 12, 2021, the entire teachings and disclosure of the application are incorporated herein by reference thereto.

BACKGROUND OF THE INVENTION

The subject matter relates to retrofitting existing wind turbine foundations.

SUMMARY OF THE INVENTION

On shore wind turbine foundations usually are made from concrete, in particular steel-reinforced concrete; The foundations are usually cast in situ and have a pedestal with an anchor cage on which the turbine tower is fixed. The size of the foundation is chosen such that it gives a solid stand for the tower and the turbine for an estimated lifespan of 20 years or more.

Due to developments in terms of turbines and tower technology, the height of towers and the size and weight of turbines increases ever since the first wind turbines have been installed. Now, after more than 10 years, preferably 20 years of operation, existing wind turbines lack efficiency compared to new wind turbines. Moreover, the cost for maintaining existing wind turbines increases at least proportional to the age of the wind turbine.

For this reason, there is a need to replace existing wind turbines by newer ones. As has been said, the newer wind turbines often times have higher towers and larger turbines, with higher loads. Due to this fact, the existing wind turbine foundations are not sufficient anymore for founding new turbines. Nevertheless, due to the limited availability of building plots for new wind turbines in densely populated areas, it is necessary to build the new wind turbines at positions, where existing wind turbines had been installed.

Thus, there is a need for concepts on how to enable the installation of new wind turbines at location where existing wind turbines are installed.

The inventors have found that it may be beneficial to retrofit existing wind turbine foundations in order to empower these existing wind turbine foundations for taking up newer, higher and heavier wind turbines.

This is possible with a retrofit according, to the present disclosure. A retrofit in the current sense is a construction, which is capable to be installed on-site on an existing construction.

The retrofit according to the subject matter comprises a perimetral structure. The perimetral structure is a construction structure, which can be placed around an outer perimeter of a base of the existing wind turbine foundation.

Wind turbine foundations usually have a base and a pedestal. The base is a slab like construction, often times having a circular perimeter and being founded within the ground. The footprint of the base has several square meters. In a cross-sectional view the base often times tapers from the center to the outer perimeter. In the center of the base, the pedestal projects from the base. The pedestal oftentimes is monolithical with the base. On top of the pedestal the anchor cage is arranged, which anchor cage being embedded within the pedestal and/or the base, in particular using bars, in particular post tensioned bars or tendons. In the following, the term bar, post tensioned bars, tendons and post tensioned tendon can be used as synonyms. The term circular may include a circle or an ellipsoid.

The perimetral structure is arranged along the outer perimeter of the base. It is proposed that the height of the perimetral structure is similar or equal the height of the base at its outer perimeter. The perimetral structure preferably is arranged neighboring the outer perimeter of the base, preferably being flush with the base for instance at the lower surface, facing towards the ground and/or the upper surface facing away from the ground. Nevertheless, the height of the perimetral structure may also be different than the height of the base at its outer perimeter.

In addition to the perimetral structure, the retrofit comprises a pedestal structure. The pedestal structure is placed on top of the existing pedestal. The pedestal structure in particular is cap like or cover like placed on top of the existing pedestal. In particular, the horizontal cross-sectional area of the pedestal structure is bigger than the horizontal cross-sectional area of the existing pedestal. The pedestal structure, when installed, preferably rests both on the upper surface of the existing pedestal and the upper surface of the existing base surrounding the existing pedestal. The top view of the pedestal structure may be geometrically similar to the top view of the existing pedestal, that is, the existing pedestal may have a circular perimeter and the new pedestal structure may as well have a circular, however with a larger perimeter. The pedestal structure may have a thinner wall structures in the area of the existing, pedestal than in the area of the base.

In order to provide the pedestal structure with sufficient stability to take up wind turbines with higher towers and bigger turbines than before, the pedestal structure is connected to the perimetral structure using lever arms. It is proposed that at least three lever arms extend radially from the pedestal structure towards the perimetral structure. The lever arms are attached, connected and/or fixed to both the pedestal structure and the perimetral structure. Forces that are applied on the pedestal structure, in particular from the new turbine, may be guided away from the pedestal structure into the perimetral structure by the lever arms.

In order to take up forces in all directions, the lever arms are angularly spaced apart from each other. The lever arms preferably are arranged with angular distance from each other around the pedestal structure. The lever arms extend from pedestal structure to the perimetral structure. It is preferred that the lever arms rest on the pedestal structure in particular on the lateral walls thereof. On the other hand the lever arms may rest on the perimetral structure, in particular on its top surface. The lever arms can be connected to the pedestal structure preferably at the lateral walls, whereas the lever arms can be connected to the perimetral structure at the top surface thereof.

In order to provide sufficient mechanical strength for taking up forces from the pedestal structure, it is proposed that the perimetral structure is a closed ring. A closed ring can be a monolithically built construction. The ring may be circular or polygonal, in particular hexagonal or octagonal. The form of the ring corresponds in particular to the form of the outer perimeter of the base of the existing wind turbine foundation.

The form of the outer perimeter of the perimetral structure may differ from the form of the inner perimeter of the perimetral structure. The inner perimeter of the perimetral structure may be in close proximity to or in contact with the existing base foundation. i.e. the lateral walls of the base. The outer and inner perimeter of the perimetral structure may also be identical. The perimetral structure may be slab like having an inner opening for taking up the existing base. The perimetral structure may be a perimetral beam.

According to embodiments, the perimetral structure laterally embraces the base of the existing wind turbine. The perimetral structure may be beam or slab shaped having an inner opening. The size and form of the inner opening may correspond to the size and form of the base of the existing wind turbine. Thus, the perimetral structure may be placed around the base, i.e. embrace the base laterally.

It is preferred when the perimetral structure is in contact with at least parts, preferably all of the outer perimeter of the existing wind turbine. The perimetral structure may have an outer perimetral surface and an inner perimetral surface. The inner perimetral surface may be in contact with the outer perimetral surface of the existing base.

As has been explained above, an existing foundation has a base and a pedestal. In the installed position, the pedestal extends axially in a vertical direction. Thus, the pedestal structure extends in axial direction of the pedestal of the existing wind turbine and covers the upper surface of the existing pedestal. In the area covering the existing pedestal, a new anchor cage may be provided, as will be explained below.

According to embodiments, the pedestal structure laterally embraces the outer perimeter of the pedestal of the existing wind turbine. An existing pedestal extends axially from the base. The part of the pedestal extending above the base has lateral walls. The pedestal structure circumferentially embraces these walls. Thus, the pedestal structure encloses the existing pedestal cap like.

According to embodiments, the pedestal structure, the perimetral structure and/or the lever arms are made from mineral construction material, in particular concrete. The pedestal structure, the perimetral structure and/or the lever arms may be cast in situ to or precast and brought to the installation side. The construction material, in particular the concrete may be reinforced using fibers, in particular carbon fibers, basalt fibers, glass fibers or steel fibers. Also concrete aggregates might be replaced in a percentage by scraps (e.g. steel) in order to get High Density Concrete. Reinforcement might be replaced by fibers.

It is preferred when the pedestal structure and the perimetral structure are reinforced to a higher extend than the lever arms. Preferably the pedestal structure and the perimetral structure are made from higher density (e.g. HOC) concrete than the lever arms (e.g. NOC). Since the lever arms are arranged in between the pedestal structure and the perimetral structure, they are used for guiding forces from the pedestal structure to the perimetral structure. As such mostly compressive forces and less tensional forces apply on the lever arms. Mineral construction material, in particular concrete, has per sea high compressive strength, for which reason the lever arms may need only less reinforcement than the pedestal structure or the perimetral structure. Reinforcement material is used for increasing the tensile strength of the material. On the other hand the pedestal structure and the perimetral structure need to bear more tension forces and therefore may need higher reinforcement than the lever arms.

According to embodiments, the pedestal structure and the perimetral structure are made from the same construction material, in particular being similarly reinforced providing similar or the same tensile strength.

According to embodiments, the pedestal structure and the perimetral structure are made from high density concrete or ultra high density concrete and the lever arms are made from normal density concrete. The high density concrete or ultra high density concrete of the pedestal structure and the perimetral structure enable these to have a higher weight for stability the structure. High tensile forces may occur due to the tower of the wind turbine being placed on top of the pedestal structure. The forces may be guided from the pedestal structure via the lever arms into the perimetral structure and therein the forces may act as tensile forces.

According to embodiments, the pedestal structure also has an anchor cage. This anchor cage, however, can have a larger diameter than the anchor cage of the existing pedestal. Thus, the anchor cage of the pedestal structure can radially be arranged within the area, which laterally embraces the outer perimeter of the pedestal of the existing wind turbine. This results on the one hand in a larger diameter of the new-anchor cage compared to the existing anchor cage and on the other hand in the new anchor cage being fixed to the pedestal structure in an area with sufficient height of the structure. That is, within the area of the top surface of the existing pedestal, the pedestal structure has only a small wall height whereas in the area laterally embracing the existing pedestal the wall has wall height which reaches from the top of the pedestal structure down to the top surface of the existing base. Within this wall, the pedestal structure can be fixed, e.g. using bars or tendons.

As has been said, the anchor cage is arranged radially in an area, which lies outside the top surface of the existing pedestal. In this area, the wall thickness for fixing the anchor cage to the pedestal structure is big enough, since the wall ranges from the top surface of the pedestal structure down to the top surface of the existing base.

Within this wall, where the anchor cage is fixed, there can be embedded an anchor element, for instance a flat metal piece. i.e. made from steel. This anchor element can be embedded within the material of the pedestal structure. The bolts of the anchor cage of the pedestal structure can be fixed to this anchor element. The anchor element moreover is fixed to the base of the existing foundation by at least another bolt. Preferably, two bolts fix the anchor cage of the pedestal structure to the anchor element and further two bolts fix the anchor element to the existing base. The fixing of the anchor element to the base may be a combination of bolts and resin injection.

The pedestal structure has, in the area of the top surface of the existing pedestal, openings. These openings may be arranged for taking up the bolts of the anchor cage of the existing pedestal. Thus, when placing the pedestal structure on top of the existing pedestal, the existing anchor cage can be taken up by the openings of the pedestal structure. The elements of the anchor cage of the existing pedestal then may be used for further fixing the pedestal structure to the pedestal.

As has been said above, forces acting on the pedestal structure are guided away from the pedestal structure via the lever arms into the perimetral structure. In order to evenly distribute the forces onto the perimetral structure, it is proposed that at least three, preferably five or more lever arms are arranged around the pedestal structure. The lever arms may have equal angular distances to each other. The lever arms itself may, in angular direction, span over an angle between 1-5° or the angle can be adapted according to existing needs. The wall size of the lever arms may taper from the perimetral structure in the direction of the pedestal structure. The arc measure of a lever arm may be greater at the outer perimeter, i.e. in the area of the perimetral structure than at the inner perimeter, i.e. at the pedestal structure. This may account for higher torques (e.g. bending or flexural moments), e.g. turning moments, with increasing distance from the pedestal structure.

According to embodiments, the lever arms are connected to the base of the existing wind turbine. The base of the existing wind turbine may be covered by the pedestal structure. However, the top surface of the base outside the pedestal structure, between the pedestal structure and the perimetral structure, may be without covering. In this area, i.e. where the base of the existing foundation is free of covering, the lever arms may rest on the base, i.e. the top surface of the base. The surface of the lever arms facing towards the top surface of the base may have bolts, which are connected to the material of the base of the existing foundation. The bolts may also be secured using resin injection.

In order to fix the perimetral structure to the underground, there may be provided pile foundations or anchors in the rocks in the area of the perimetral structure, which pile foundations are fixed to the perimetral structure or are part of the perimetral structure. In particular, the piles of the foundations may in particular be arranged in an angular area of the perimetral structure, where the lever arms rest on the perimetral structure. Thus, in top view, the lever arm, the perimetral structure and the pile foundation may all lie in the same area. Having the pile foundation in the area where the lever arms rest on the perimetral structure ensures that the tensile forces applied onto the perimetral structure from the lever arms are directly taken up by the pile foundations or the anchors in the rocks.

Another aspect is a retrofitted wind turbine foundation. This foundation comprises the base and the pedestal of the existing wind turbine and the perimetral structure, the pedestal structure and the lever arms as explained above. The perimetral structure and the pedestal structure are connected to each other by at least three lever arms.

As has been explained above, the lever arms are connected to the pedestal structure and the perimetral structure. Therein, the lever arms may be attached to the pedestal structure along its lateral surface and to the perimetral structure at its upper surface.

In order to have the retrofit bear the forces applied by the new tower onto the pedestal structure, it is proposed that the ground soil below the existing foundation, in particular below the base, in particular in the area of an outer perimeter of the base is at least partially processed such that its density is reduced vis a vis the density of the ground soil being unprocessed in this area. Due to the reduced stiffness, the forces which apply onto the lever arms are guided into the perimetral structure where these forces are borne by the pile foundation or anchors of the perimetral structure instead of the existing base. This ensures the structural integrity of the existing base even in case higher tensile forces than initially expected for the existing base act on the lever arms. Since the lever arms preferably are connected by bolts and/or resin injection with the existing base, tensile forces may also apply onto the base. However, in order not to guide these tensile forces via the existing base into the ground, processing of the ground layer below the base is proposed. Processing may include removing the soil or injecting soft material.

Moreover, another aspect is a method for retrofitting wind turbine foundations with a retrofit according to the present disclosure.

BRIEF DESCRIPTION OF THE DRAWINGS

These and other aspects will be described in more detail and become apparent from the following figures. The figures show.

DETAILED DESCRIPTION

Figure 2:
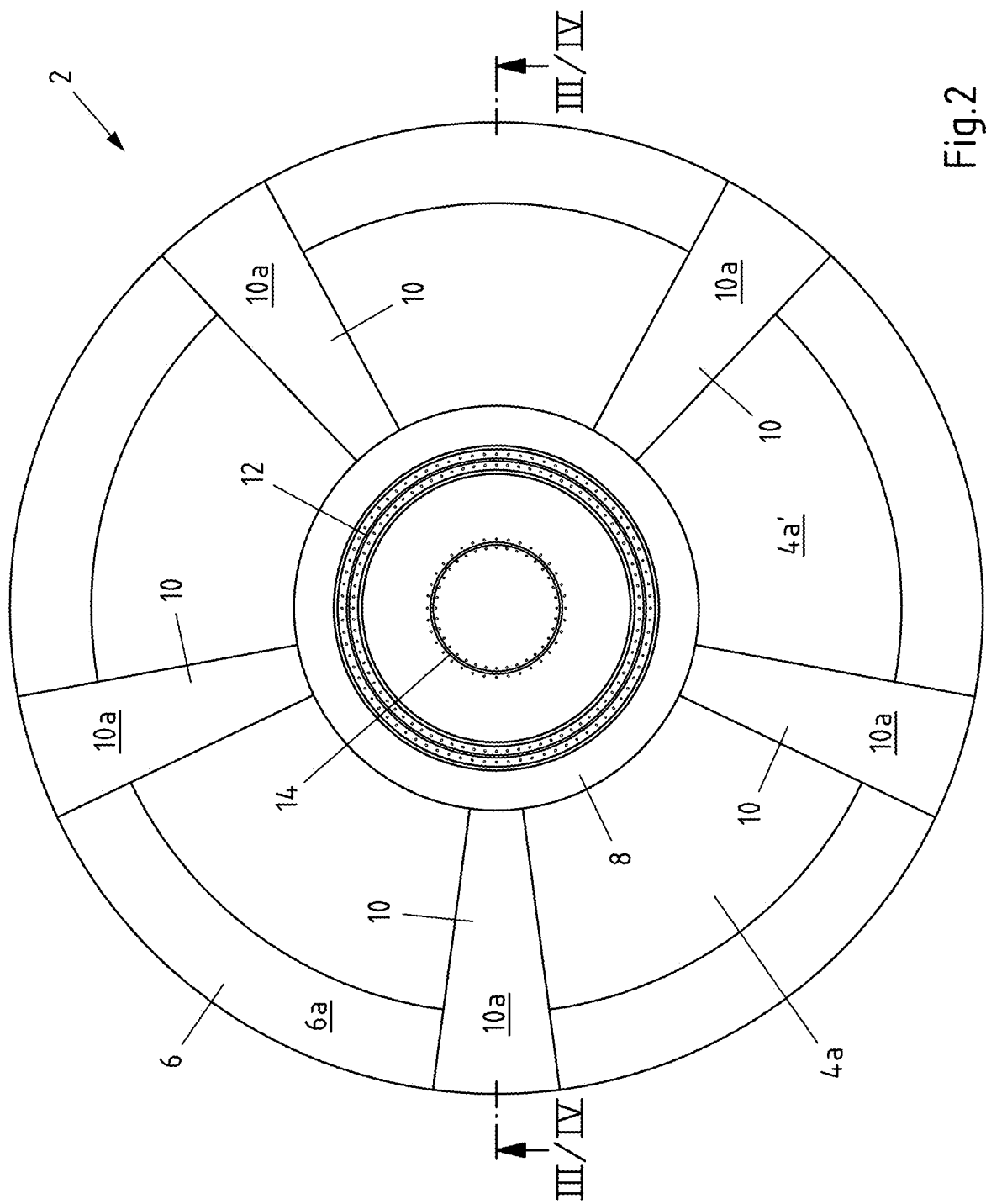
FIG. 2. is a top view of a retrofitted wind turbine foundation, according to an exemplary embodiment.

FIG. 2 shows an elevated view onto a retrofitted wind turbine foundation 2. In FIG. 2 the base 4a of an existing wind turbine foundation is shown. As can be seen, base 4a is laterally embraced by a circumferentially closed perimetral structure 6. In the middle of base 4a, there is a pedestal (not shown). This pedestal is covered cap like by a pedestal structure 8. Pedestal structure 8 is connected to perimetral structure 6 by lever arms 10.

As can be seen, lever arms 10 are connected to the lateral walls Ba of the pedestal structure 8. In addition it can be seen that lever arms 10 are connected to the perimetral structure on a top surface 6a.

Perimetral structure 6 and pedestal structure 8 are made of similar or same construction material, in particular concrete, in particular high density concrete. Reinforcement of the concrete of perimetral structure 6 and pedestal structure 8 is preferred, since both structures need to be capable of bearing high tensile forces. These tensile forces are applied onto these structures 6, 8 from a turbine tower (not shown) being connected to an anchor cage 12 of the pedestal structure 8 as will be shown herein after. An existing anchor cage 14 of the existing pedestal can further used for fixing the pedestal structure 8 onto the existing pedestal as will be shown hereinafter.

Forces or moments applied onto the pedestal structure 8 via anchor cage 12 from a tower are fend off by lever arms 10 onto perimetral structure 6. Thus, the lever arms 10 need to bear mostly only high compression forces, for which reason the lever arms 10 can be made of material having a lower tensile strength than the material of the structures 6, 8. For instance, lever arms 10 may be made of normal density concrete.

Figure 1:
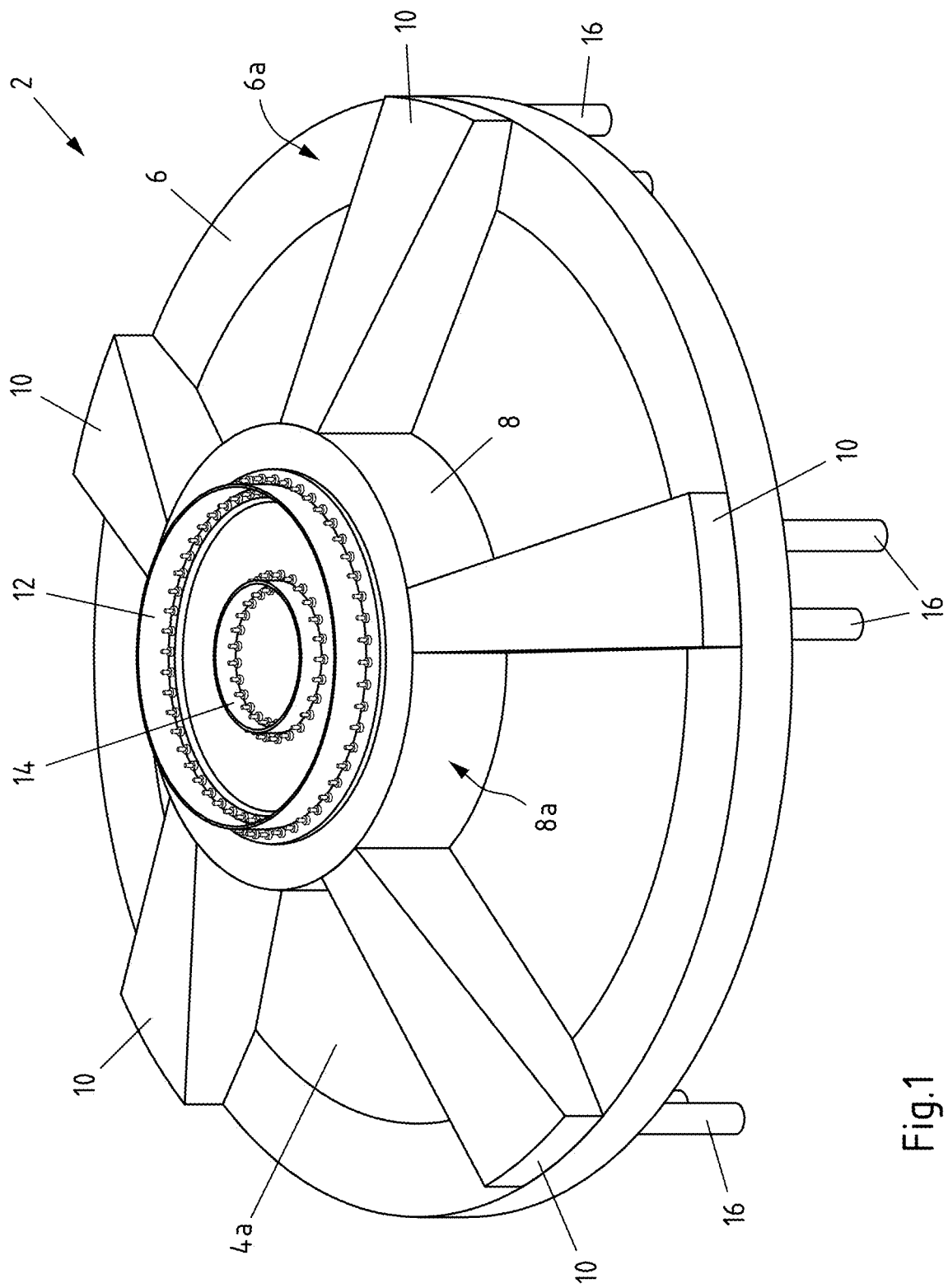
FIG. 1 is a view onto a retrofitted wind turbine foundation, according to an exemplary embodiment.

As can be seen in FIG. 1 as well, lever arms 10 are arranged with equal angular distances around the pedestal structure 8. The lever arms 10 taper in a radial direction from outside to inside. Moreover, in FIG. 1 pile foundations 16 are shown. These pile foundations 16 are founded into the ground. The pile foundations 16 preferably are arranged in an area, where the lever arms 10 rest on the perimetral structure 6.

After having retrofitted the existing foundation with the structures 6, 8, 10, excavated backfill material may be filled onto base 4a in particular in between lever arms 10, preferably also on top of lever arms 10 giving higher weight to the structure and such increasing its ability to bear moments from the tower.

FIG. 2 shows a top view of a retrofitted foundation 2 according to FIG. 1. In FIG. 2 it can be seen, that the lever arms 10 rest in an area 10*a* on top of the perimetral structure 6. Moreover, it can be seen, that the lever arms 10 are evenly distributed around the perimeter of the pedestal structure 8. FIG. 2 also illustrates that the lever arms 10 taper starting from the area 10*a* towards the outer perimeter of the pedestal structure 8.

As can also be seen in FIG. 2, the construction of the anchor cage 12 of the retrofit embraces the anchor cage 14 of the existing pedestal. The top surface of the existing pedestal is illustrated in FIG. 2 by circular 17. It can be seen, that pedestal structure 8 has a larger diameter, preferably at least 1.5 times, more preferably more than 2 times the diameter of the existing pedestal.

Figure 3:
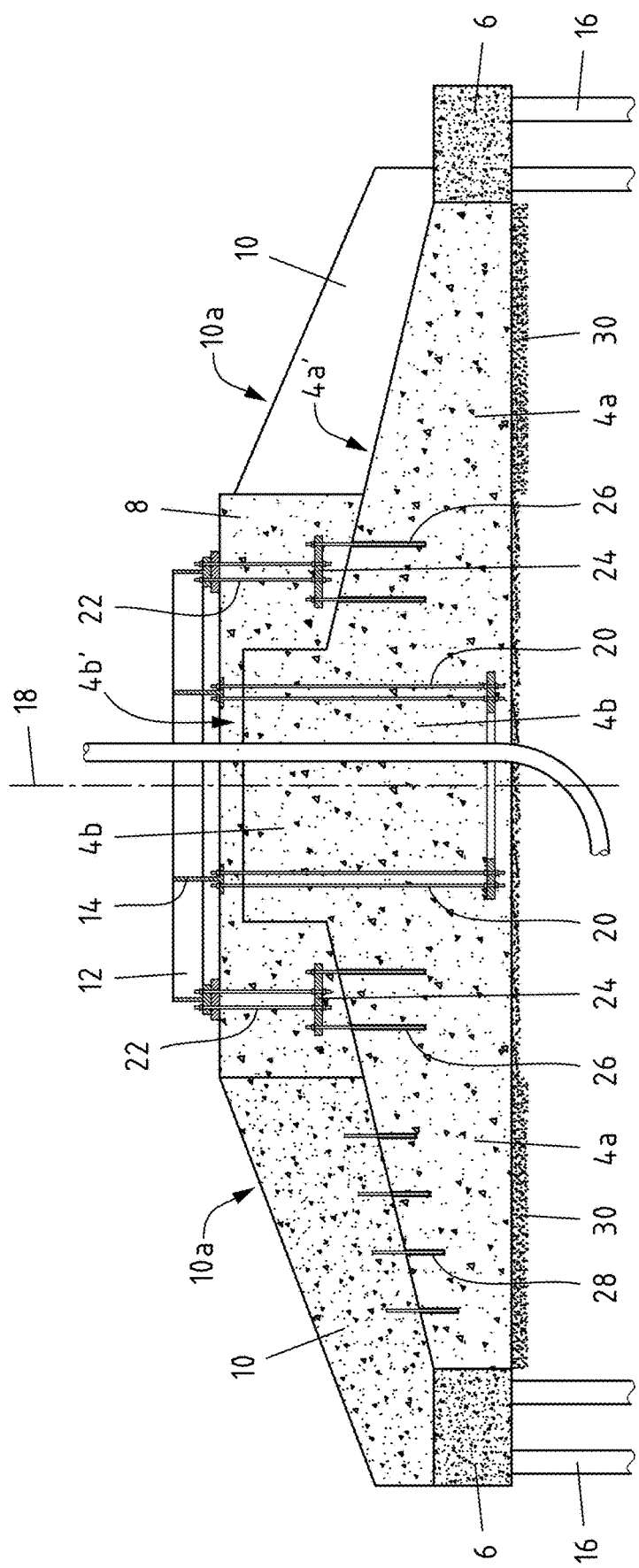
FIG. 3 is a sectional view of a foundation according to FIG. 2.

FIG. 3 shows a cross section along Section III-III of FIG. 2. As can be seen, lever arms 10 rest on the top surface of the perimetral structure 6. Perimetral structure 6 is founded in the ground by pile foundations 16.

Moreover it can be seen that the existing foundation has a base area 4*a* and a pedestal 4*b*. Pedestal 4*b* extends in axial direction 18 beyond the top surface 4*a*' of existing base 4*a*.

In the area of pedestal 4*b*, the pedestal structure 8 is arranged cap like above pedestal 4*b*. Therein, pedestal structure 8 embraces pedestal 4*b*, in particular circumferentially. Pedestal structure 8 rests on the one hand on the top surface 4*b*' of pedestal 4*b* and on the other hand on the top surface 4*a*' of base 4*a*. In particular, due to the increased diameter of pedestal structure 8 versus pedestal 4*a*, pedestal structure 8 has a larger wall size in the area of the base top surface 4*a*' than in the area of pedestal top surface 4*b*'.

Extending from the pedestal top surface 4*b*' bolts 20 being embedded within the existing foundation reach through the wall of pedestal structure 8. On the top surface of pedestal structure 8, these bolts 20 are used for fixing pedestal structure 8 to pedestal 4*b*.

In addition, pedestal structure 8 and/or the anchor cage 12 is secured by bolts 22 to the existing foundation. It is preferred that bolts 22 are fixed to anchor elements 24 embedded within the material of pedestal structure 8. In turn, anchor elements 24 are fixed to base 4*a* by bolts 26, which preferably are also resin injected. Thus, pedestal structure 8 is securely affixed to base 4 on the one hand via bolts 22, anchor elements 24 and bolts 36 and on the other hand via bolts 20. At the bolts 22 the anchor cage 12 is arranged for taking up a new tower. As can be seen in FIG. 3, the diameter of this anchor cage 12 is larger than that of the existing anchor cag 14, thus a bigger tower with a larger diameter can be taken up.

In FIG. 3 it can also be seen, that lever arms 10 are secured to the base 4*a* by bolts 28. Bolts 28 may be in the form of shear rebar connections. They may be resin injected into the material of base 4*a*.

In addition, in FIG. 3, it can be seen that in a circumferential, outer-radial area 30, the ground on which the foundation 4 rests, may be processed. Within this area 30, base 4*a* can move and thus avoid the forces applied by the lever arms 10. This results in that the forces are guided to perimetral structure 6 and pile foundations 16 which are constructed to bear higher tensile forces and thus higher forces than the existing base 4.

Figure 4:
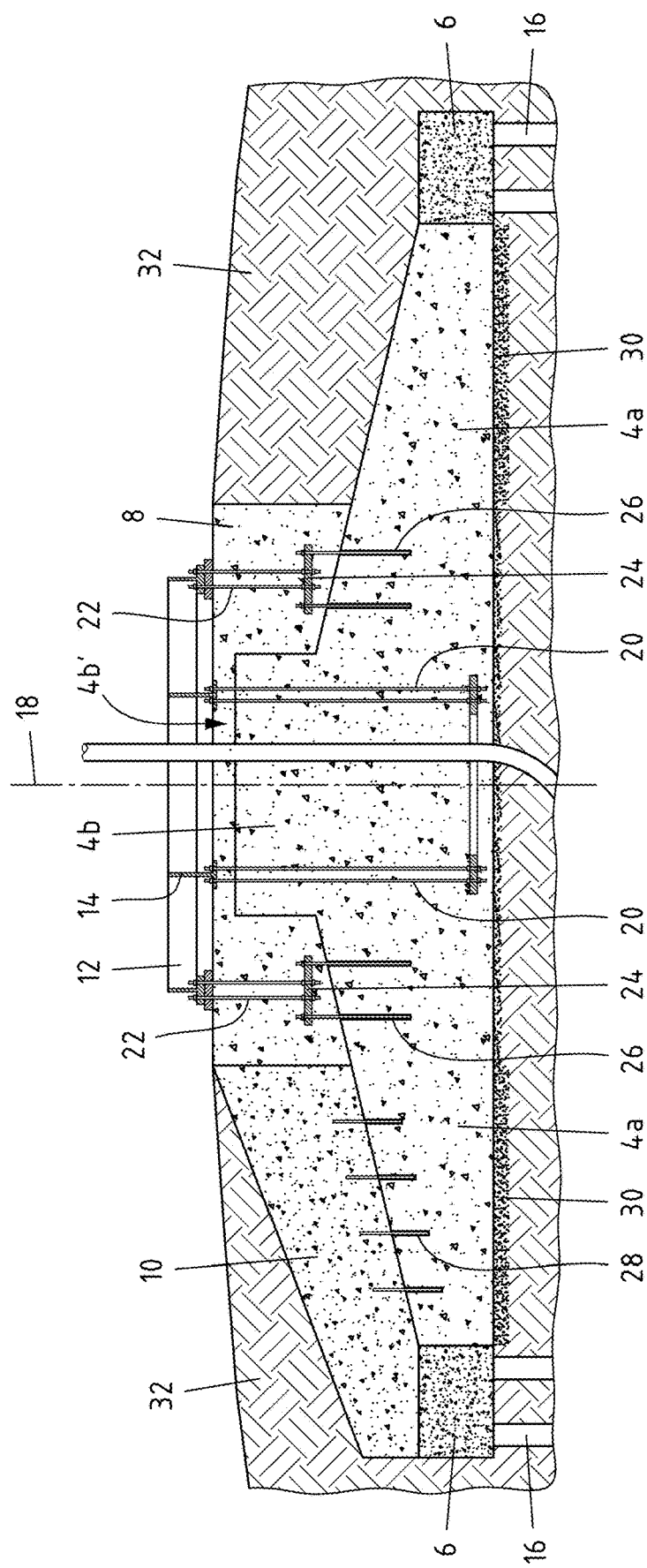
FIG. 4 is a sectional view of a refilled foundation according to FIG. 3.

FIG. 4 shows construction of FIG. 3, where in addition backfill material 32 is placed at least on top of top surface 4*a* but also on top of the lever arms 10 and perimetral structure 6. However, top surface of pedestal structure 8 may be free of backfill material 32 in order to have free access to the anchor cage 12 enabling easy installation of the tower.

Figure 5A:
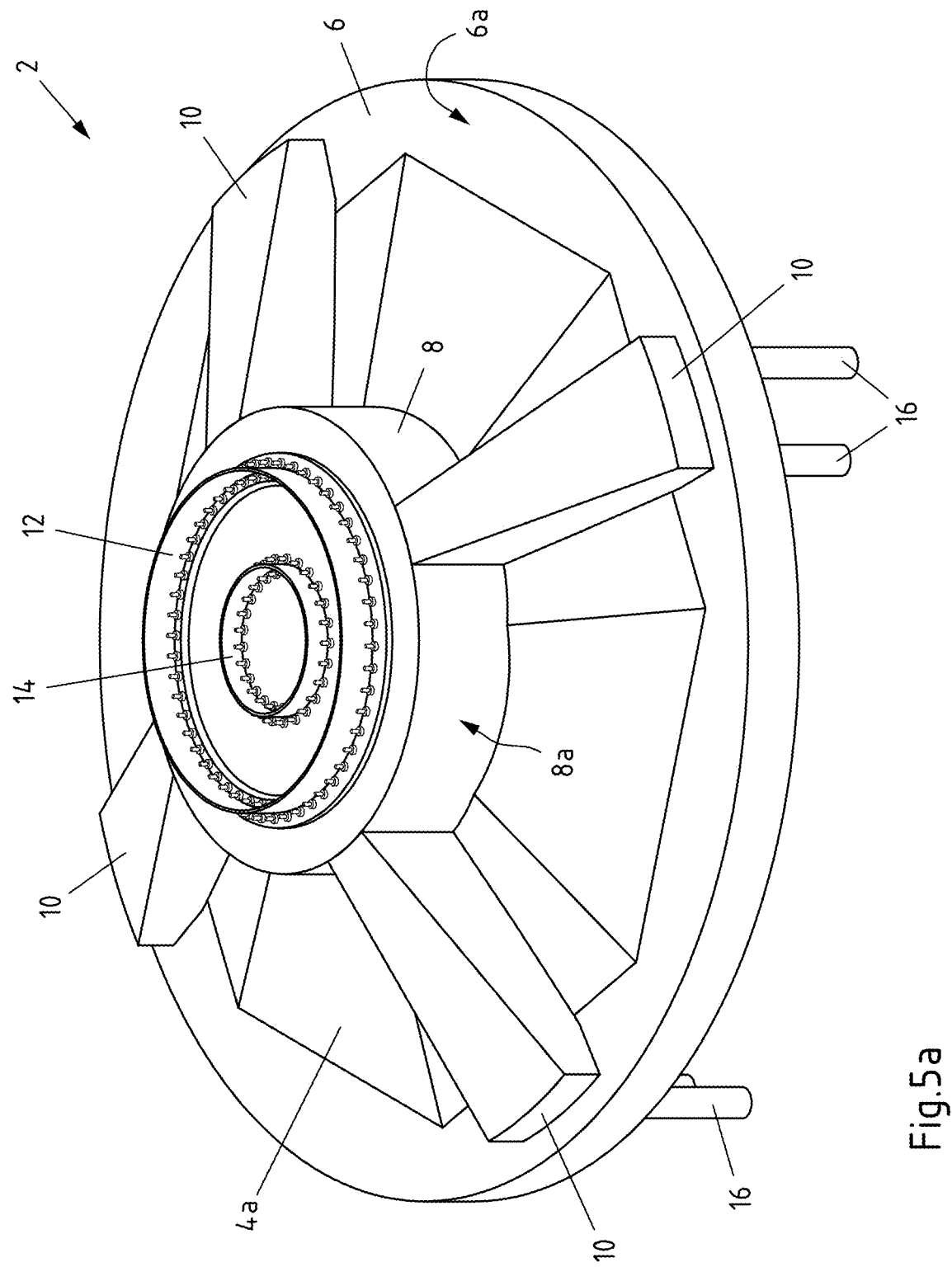
FIG. 5a-c are various forms of retrofits according to exemplary embodiments.

FIG. 5*a* shows an embodiment, where the existing base 4*b* is octagonal. As can be seen, the perimetral structure 6 has an inner perimeter corresponding to the octagonal. form of base 4*a*. However, on the outer perimeter, the perimetral structure 6 can be circular.

Figure 5B:
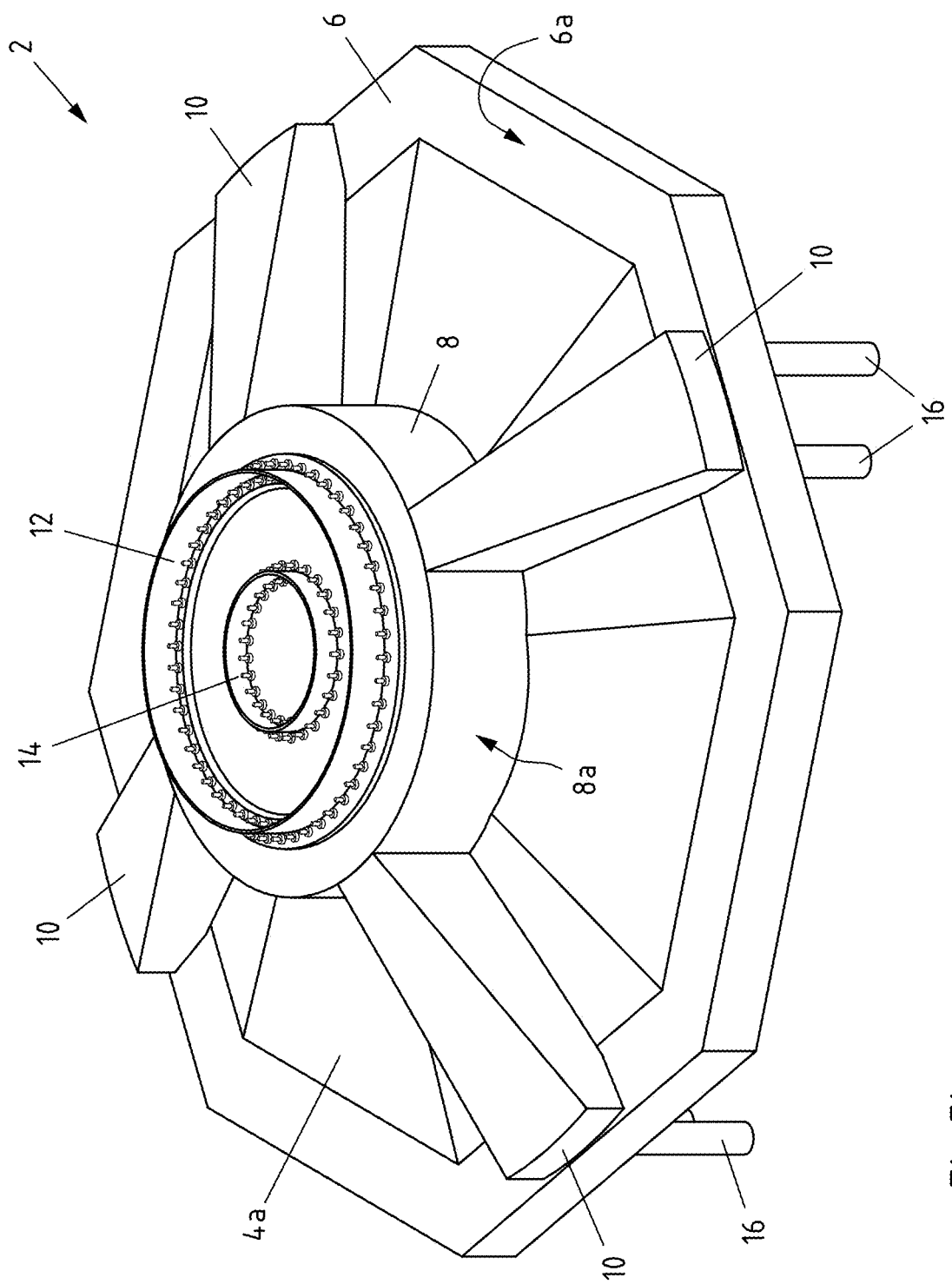

FIG. 5*b* shows a further embodiment, where base 4*a* is octagonal. In contrast to FIG. 5*a* perimetral structure 6 has an outer perimeter being geometrically similar to the perimeter of the base 4*a*, i.e. in this example also octagonal.

Figure 5C:
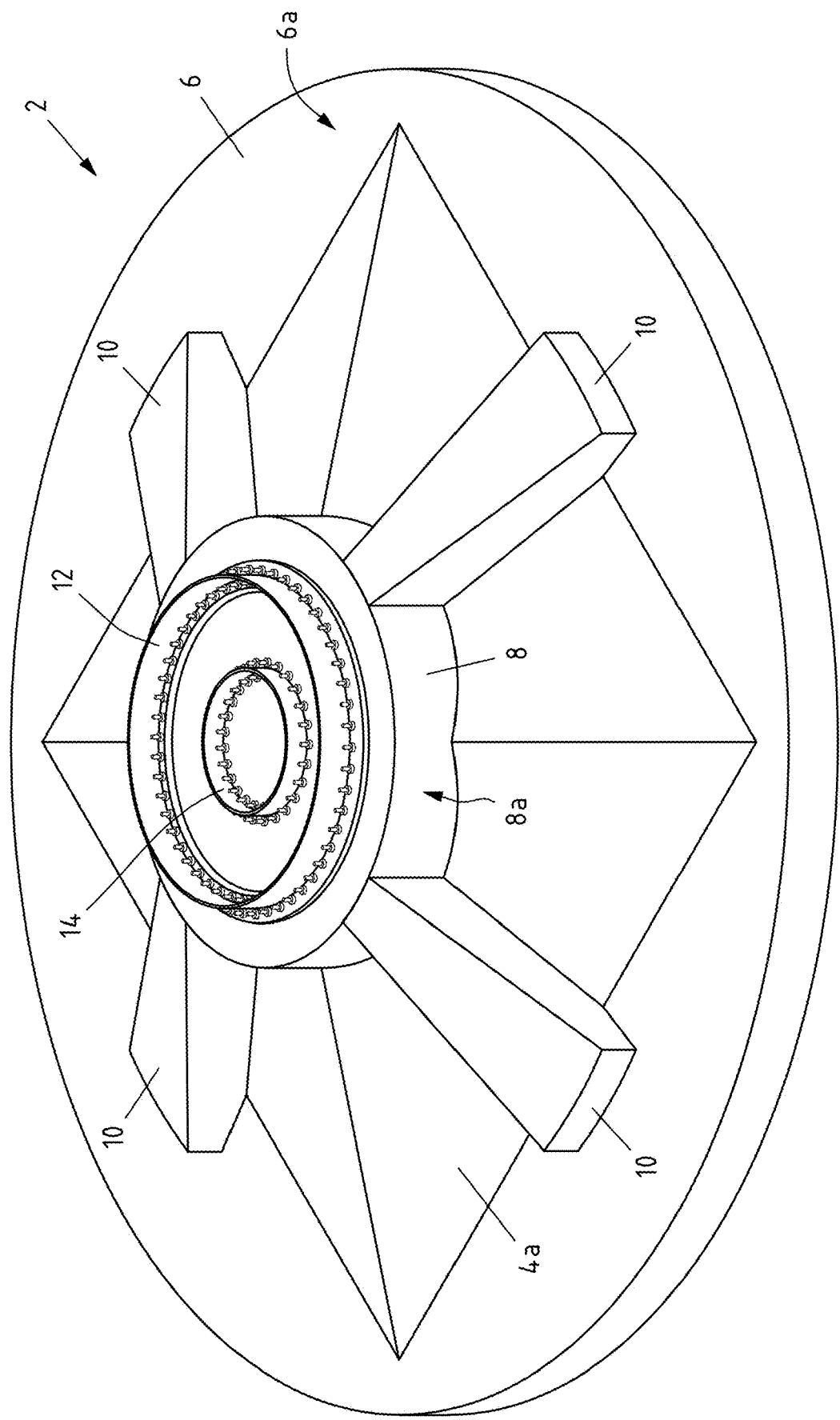

FIG. 5*c* shows a further embodiment, where the outer perimeter of base 4*a* is a square. The inner perimeter of the perimetral structure 6 corresponds to this square. Perimetral structure 6 preferably has an inner perimeter corresponding to the outer perimeter of base 4*a* and an outer perimeter being similar or different to the form of the inner perimeter. Preferably the outer perimeter is circular or polygonal.

By providing the retrofit, existing bases may be used for taking up bigger wind turbines at exactly the same construction site.

All references, including publications, patent applications, and patents cited herein are hereby incorporated by reference to the same extent as if each reference were individually and specifically indicated to be incorporated by reference and were set forth in its entirety herein.

It should be understood that the figures illustrate exemplary embodiments in detail, and it should be understood that the present application is not limited to the details or methodology set forth in the description or illustrated in the figures. It should also be understood that the terminology is for purpose of description only and should not be regarded as limiting.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A retrofit for existing wind turbine foundations comprising:
   a perimetral structure around an outer perimeter of a base of the existing wind turbine foundation,
   a pedestal structure on top of a pedestal of the existing wind turbine foundation and
   at least three lever arms, wherein the lever arms extend radially from the pedestal structure to the perimetral structure and are angularly spaced wherein
   the lever arms connect the perimetral structure with the pedestal structure.

2. The retrofit of claim 1, wherein
   the perimetral structure is a closed ring.

3. The retrofit claim 1, wherein
   the perimetral structure laterally embraces the base of the existing wind turbine and/or is in contact with at least parts of the outer perimeter of the existing wind turbine.

4. The retrofit of claim 1, wherein
   the pedestal structure extends in an axial extension of the pedestal of the existing wind turbine foundation.

5. The retrofit of claim 1, wherein
   the pedestal structure laterally embraces the outer perimeter of the pedestal of the existing wind turbine foundation.

6. The retrofit of claim 1, wherein
   the pedestal structure has an inner profile corresponding to an outer profile of the pedestal of the existing wind turbine foundation.

7. The retrofit of claim 1, wherein
   the pedestal structure, the perimetral structure and/or the lever arms are made from mineral construction material, in particular concrete and/or the pedestal structure and the perimetral structure are made from the same construction material, in particular with the same density and/or the lever arms are made from mineral construction material with less density than the pedestal structure and/or the perimetral structure.

8. The retrofit of claim 1, wherein
   the pedestal structure and the perimetral structure are made from high density concrete and the lever arms are made from normal density concrete.

9. The retrofit of claim 1, wherein
   an anchor cage of the pedestal structure is radially arranged within the area which laterally embraces the outer perimeter of the pedestal of the existing wind turbine foundation.

10. The retrofit of claim 1, wherein
    bolts of the anchor cage of the pedestal structure are fixed to an anchor element embedded within the material of the pedestal structure and that the anchor element is fixed to the base of the existing wind turbine foundation by at least one bolt.

11. The retrofit of claim 1, wherein
    the pedestal structure on top bolts on top of the pedestal of the existing wind turbine foundation has openings for taking up bolts of the anchor cage of the existing wind turbine foundation.

12. The retrofit of claim 1, wherein
    at least three, preferably five lever arms are arranged around the pedestal structure in equal angular distances to each other.

13. The retrofit of claim 1, wherein
    the lever arms are connected to the base of the existing wind turbine foundation by shear reinforcement elements, in particular comprising resin injection.

14. The retrofit of claim 1, wherein
    the perimetral structure is mounted on a pile foundation.

15. A method for retrofitting wind turbine foundation with a retrofit according to claim 1 comprising:
    arranging the perimetral structure around the base,
    arranging the pedestal structure on top of the pedestal and
    connecting the pedestal structure with the perimetral structure using at least three lever arms, wherein the lever arms extend radially from the pedestal structure to the perimetral structure and are angularly spaced.

16. A retrofitted wind turbine foundation comprising:
    a base,
    a perimetral structure around the base,
    a pedestal,
    a pedestal structure on top of the pedestal and
    at least three lever arms, wherein the lever arms extend radially from the pedestal structure to the perimetral structure and are angularly spaced wherein
    the lever arms connect the perimetral structure with the pedestal structure.

17. The retrofitted wind turbine foundation according to claim 16, wherein
    a stiffness of a ground layer below the base is reduced.

* * * * *